United States Patent [19]

Hata et al.

[11] 4,145,121
[45] Mar. 20, 1979

[54] LIGHT MODULATOR

[75] Inventors: Susumu Hata, Tokorozawa; Kenji Kajiyama, Kodaira; Yoshihiko Mizushima, Fuchu, all of Japan

[73] Assignee: Nippon Telegraph and Telephone Public Corporation, Tokyo, Japan

[21] Appl. No.: 710,961

[22] Filed: Aug. 3, 1976

[30] Foreign Application Priority Data

Aug. 9, 1975 [JP] Japan .................. 50-97018

[51] Int. Cl.² .............................................. G02F 1/00
[52] U.S. Cl. .................. 350/355; 350/96.14
[58] Field of Search .......... 350/160 R, 96 WG, 96 C, 350/96.10, 96.11, 96.12, 96.13, 353, 355, 96.14

[56] References Cited

U.S. PATENT DOCUMENTS

| | | | |
|---|---|---|---|
| 3,454,843 | 7/1969 | Fulop et al. ........................ | 350/355 |
| 3,465,159 | 9/1969 | Stern ................................. | 250/211 J |
| 3,748,597 | 7/1973 | Reinhart ........................... | 350/150 X |
| 4,035,058 | 7/1977 | Papuchon ......................... | 350/96 C |

*Primary Examiner*—Stanley D. Miller, Jr.
*Assistant Examiner*—James W. Davie
*Attorney, Agent, or Firm*—Burgess, Ryan and Wayne

[57] ABSTRACT

The invention discloses a light modulator comprising a semiconductor substrate, a curved thin-film semiconductor optical waveguide having a predetermined curvature and, semiconductor electrode layers formed contiguous to the waveguide, whereby when a potential is applied across the electrode layers, the carrier density in the regions adjacent the waveguide may be varied and consequently the radiation loss in the curved waveguide may be varied accordingly to modulate light radiating through the waveguide in response to the electric potential applied across the electrode layers.

10 Claims, 4 Drawing Figures

LIGHT MODULATOR

BACKGROUND OF THE INVENTION

The present invention relates to a light modulator wherein the radiation loss in a curved or bent optical waveguide is variable so as to modulate light propagating through the waveguide.

In order to construct a light modulator with an optical waveguide or waveguides, the light radiation characteristic of the waveguides must be externally variable. One method for varying the radiation characteristic is to externally control the dielectric constant and dielectric constant distribution of the waveguide both of which are parameters affecting the radiation characteristic. Meanwhile the characteristics of a light modulator are evaluated in terms of the modulation factor, insertion loss, speed, size, operability and so on. The features of semiconductor light modulators are their compact size and excellent operability. The conventional light semiconductor modulators so far invented and demonstrated are based upon the absorption and electro-optical effects of semiconductors so that there arises a problem that their size becomes inevitably large to attain a practical modulator factor. In other words, various features of the semiconductors have not been fully used in the conventional semiconductor light modulators.

There have been also devised and demonstrated semiconductor light modulators of the type in which two linear optical waveguides are formed within a semiconductor by changing the carrier density, while the coupling efficiency between them is varied by varying the width of a depletion layer formed adjacent one of the waveguides by controlling an externally applied reverse voltage. One of these semiconductor devices is disclosed, for instance, in the article entitled "A new light modulator using perturbation of synchronism between two coupled guides", by K. Tada al., Applied Physics Letters, Vol. 25, No. 10, 15 Nov. 1974, begining at page 561. The semiconductor device disclosed in the above reference, however, has a problem that the coupling length between the two waveguides and hence the overall length of the semiconductor device must be sufficiently long to attain a satisfactorily high coupling efficiency between the waveguides and the modulation efficiency is low.

SUMMARY OF THE INVENTION

In view of the above, one of the objects of the present invention is to provide a light modulator which is extremely simple in construction and small in size yet capable of attaining a higher degree of modulation with an extremely small electric power consumption.

Another object of the present invention is to provide a ligh modulator in which the radiation loss in a curved or bent optical waveguide is variable so that the modulation efficiency may be considerably increased.

Briefly stated, to the above and other ends the present invention provides a light modulator comprising a semiconductor substrate, a curved semiconductor thin-film optical waveguide formed on the semiconductor substrate and curved at a predetermined radius, the waveguide having a carrier density different from that of the semiconductor substrate, and a pair of electrodes, one being disposed adjacent the optical waveguide while the other being disposed on the bottom of the semiconductor substrate, whereby the carrier density difference between the semiconductor substrate and the optical waveguide may be varied in response to a potential externally applied across the pair of electrodes and consequently the radiation loss in the curved optical waveguide is varied accordingly, thereby modulating light propagating through the waveguide.

DESCRIPTION OF THE PREFERRED EMBODIMENTS

Prior to the description of the preferred embodiments of the present invention, the underlying principle will be described. In general optical waveguides are made of dielectric materials, and the cross section of a portion through which light is propagated is selected a few times to tens of times the wavelength of light depending upon the use of an optical waveguide. It is needless to point out that optical waveguides may be made of semiconductors which are a kind of dielectric materials. To form an optical waveguide of a semiconductor which is a kind of dielectric material, the dielectric constant of the light radiation path of an optical waveguide must be made higher than the dielectric constant of a medium surrounding the optical waveguide. There are two methods for providing a higher dielectric constant. One method is to join two different semiconductors while the other method is to control the density of carriers in a semiconductor to provide a dielectric constant difference. The latter method is based on the fact that the higher the density of carriers is the lower the dielectric constant becomes. Therefore when a semiconductor is fabricated so as to have two regions with different carrier densities, there is a dielectric constant difference between the two regions. For this purpose, impurities may be doped into a semiconductor or may be electrically injected into it from the exterior.

The transmission losses in optical waveguides are in general caused by the loss of light due to the absorption, the scatter loss due to the scattering of light at reflecting surfaces and the radiation loss at a bend of an optical waveguide. The radiation loss in turn is very closely corelated with the construction of a waveguide; that is, the width and radius of curvature and the difference in dielectric constant between the waveguide and the surrounding medium or substrate. Therefore the use of bent optical waveguides is very advantageous because a high modulation sensitivity can be attained and the complete cutoff of light can be effected.

In view of the above, according to the present invention a bent optical waveguide is formed within a semiconductor substrate by changing the density of carriers within the substrate so that the radiation loss may be positively utilized to minimize the absorption and scatter losses. The radiation loss of an optical waveguide in accordance with the present invention is greatly dependent upon the design parameters such as the width and radius of curvature of a waveguide and the difference in dielectric constant between the waveguide and the surrounding semiconductor substrate. Therefore a light modulator in accord with the present invention which is characterized in that the radiation loss in bent optical waveguides may be variable has the unique features that its modulation efficiency can be increased and it may be made extremely compact in size to meet the insatiable demands for miniaturization.

Figure 1:
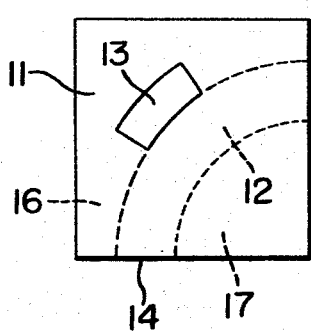
FIG. 1 is a schematic view used for the explanation of the underlying principle of the present invention.

The modulation principle in accordance with the present invention will be further described in detail with reference to FIG. 1, in which a light modulator in accordance with the present invention is designated by the reference numeral 10. The light modulator 10 comprises a semiconductor 11, a bent optical guide 12, an electrode 13 for varying the density of carriers and two semiconductor regions 16 and 17 which are formed of the same material as that of the optical waveguide 12 and on opposite sides thereof. The waveguide 12 has an input end 14 and an output end 15. The electrode 13 is formed on the semiconductor 11 to form a pn junction with the waveguide 12 and a similar electrode (not shown) is also formed on the opposite surface of the semiconductor 11 in opposed relation with the electrode 13 so that the radiation loss may be varied.

Next the mode of operation will be described. The bent optical waveguide 12 has a dielectric constant higher than other regions so that the density of carriers in the waveguide 12 is low. The density of carriers in the region immediately below the electrode 13 is controlled from the exterior. To form a uniform optical waveguide, the density of carriers in the region immediately below the electrode 13 is made equal to that in the region 16. Then light injected at the input end 14 propagates through the optical waveguide 12 without any loss and emerges out of the output end 15. As the carrier density in the region immediately below the electrode 13 is gradually decreased, the dielectric constant of this region increases accordingly toward the dielectric constant of the waveguide 12 so that the radiation loss is also increased accordingly. As a result, the light output at the output end 15 of the waveguide 12 becomes equal to the light input at the input end 14 minus the radiation loss caused in the waveguide 12. In other words, the light output emerging from the output end 15 is modulated in response to the change in carrier density in the region immediately below the electrode 13. It is this radiation loss that is used in the light modulator 10 in accordance with the present invention. The variation in radiation loss is extremely responsive to the variation in carrier density in the region immediately under the electrode 13 so that only a very small current is required to be applied to the electrode 13 to vary the carrier density.

Figure 2:
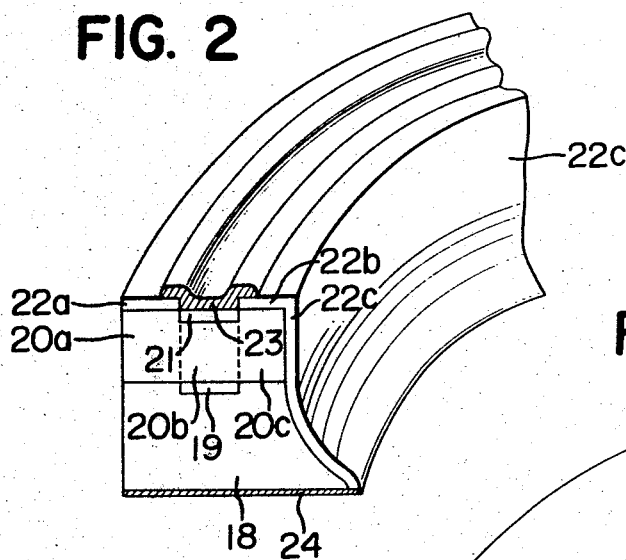

In FIG. 2 shown is the second embodiment of the present invention comprising a p+ type silicon substrate 18 200 μm in thickness and with the carrier density of $10^{19}$ cm$^{-3}$. By doping arsenic ions into a predetermined portion of the substrate 18, a P$^-$ type region 19, 5μm in width, 1.5mm in length, 0.1μm in thickness and with a radius of curvature R of 50mm is formed. Formed over the P$^-$ region 19 is an i type silicon layer, 6μm in thickness by the epitaxial growth method. Formed by the diffusion of phosphorus into the i type silicon layer 20 is an n+ type region 21 having the same configuration with that of the p$^{31}$ region 19 and 0.3μm in thickness, 5μ in width, 1.5mm in length and R = 50mm. The regions 19 and 21 are semiconductor electrode layers for concentrating the current flow into a region 20b sandwiched between the regions 19 and 21, and a region 20c located radially inwardly contiguous to the region 20b is an optical waveguide. The inner side face of the inner region or optical waveguide 20c is etched to have the same radius of curvature with that of the semiconductor electrode layers 19 and 21. A region 20a radially outwardly contiguous to the region 20b is of the i type and may have any desired width. A silicon oxide layer is formed over the etched side surface 22c and top surface 22b of the region 20c and the top surface 22a of the region 20a. Alternatively an insulating material such as silicon resin may be applied over the etched side surface 22c of the region 20c. Metal electrodes 23 and 24 are attached over the top surface of the semiconductor electrode layer 21 and the bottom of the silicon substrate 18, respectively, for ohmic contact therewith.

In the light modulator with the above construction there exists a dielectric constant difference across the interface or junction between the silicon substrate 18 and the waveguide region 20c because of the difference in carrier density between them. There also exists a dielectric constant difference across the interface between the waveguide region 20c and the insulation layer formed on the top surface 22b and between the region 20c and the insulation layer formed on the side surface 22c because the waveguide region 20c has a higher dielectric constant than the insulation layers formed on the surfaces 22b and 22c.

A dielectric constant difference across the interface between the region 20b and the waveguide region 20c may be produced in a manner to be described below. When a forward bias is applied across the electrodes 23 and 24; that is, when a positive potential is applied to the electrode 24 while a negative potential is applied to the electrode 23, electrons are injected into the region 20b from the upper semiconductor electrode layer 21 while the holes are injected into the region 20b from the lower semiconductor electrode layer 19 so that the dielectric constant of the region 20b drops. The injected carriers are all trapped in the region 20b and will not be diffused into the waveguide region 20c. As a consequence the waveguide region 20c has a higher dielectric constant than the region 20b has so that a dielectric constant difference is produced between these regions 20b and 20c. Thus the region 20c forms a bent three-dimensional optical waveguide.

Next the mode of operation of the first embodiment will be described. As has been explained with reference to FIG. 1 the density of carriers injected into the region 20b from the semiconductor electrode layers 19 and 21 is varied with respect to the carrier density in the region 20c so that the radiation loss in the waveguide region 20c may be varied.

In the experimental light modulator constructed in accordance with the first embodiment with the bent or curved waveguide region 10μm in width, 100% modulation was obtained under the conditions that the wavelength λ of light to be modulated was 1.2μm, the voltage 1.5V was applied across the electrode layers 19 and 21 to inject the carriers $10^{18}$ cm$^{-3}$ and the current was varied over 120mA.

In the first embodiment, instead of the p+ type silicon substrate 18, an n+ type silicon substrate may be used with a p+ type semiconductor electrode layer 19 instead of the n$^-$ type layer. Furthermore a GaAs or GaAlAs substrate may be used instead of the silicon semiconductor or substrate, but the construction is substantiall similar to that of the first embodiment shown in FIG. 2. Moreover a GaAs system may be used to form the region 20 on GaAlAs substrate 18.

Figure 3:
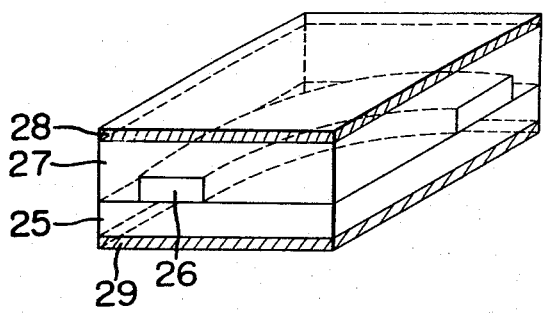
FIGS. 2, 3 and 4 are schematic perspective views used for the explanation of a first, second and third embodiments, respectively, of the present invention.

In the second embodiment shown in FIG. 3, a p type silicon substrate 25 is 200μm thick with the carrier density of $10^{16}$ cm$^{-3}$, and formed over the substrate 25 is an n$^-$ type silicon layer 26 which has a rectangular cross section 4 μm in thickness and 10 μm in width and the carrier density of $10^{15}$ cm$^{-3}$ and which is bent or curved as indicated by the broken lines with a predetermined radius of curvature R. Formed over the substrate 25 and the layer 26 is an n type silicon region 27 with the carrier density of $10^{17}$ cm$^{-3}$. Thus, the silicon layer 26 is surrounded by the silicon substrate 25 and the silicon region 27. Ohmic electrodes 28 and 29 are joined to the upper surface of the region 27 and to the bottom surface of the substrate 25, respectively.

Next the mode of operation of the light modulator with the above construction will be described. When a positive potential is applied to the electrode 28 while a negative potential, to the electrode 29, the p-n junctions between the p type silicon substrate 25 and the n$^-$ type layer 26 and between the p type substrate 25 and the n type region 27 are reverse biased so that a depletion region is formed at each p-n junction. The thickness of the depletion region is dependent upon the reverse bias voltage. In the second embodiment, the carrier density in the n$^-$ type silicon layer 26 is lower than the carrier density in the p type silicon substrate 25 and the n-type silicon region 27 so that the depletion regions tend to be extended into the n$^-$ type layer 26. Therefore whereas the avalanche breakdown voltage of the p-n junction between the p type silicon substrate 25 and the n type silicon region 27 is as high as 57V, a voltage required for expanding the depletion region into the whole n$^-$ type silicon type 26 is only 12V. When the reverse bias voltage is 12V, the depletion region at the junction between the p type silicon substrate 25 and the n type silicon region 27 has a thickness of about 1 μm. No carrier exists in the depletion region so that the dielectric constant of the depletion region is minimum and accordingly this depletion region is used as an optical waveguide. Light energy injected into the waveguide region from one end thereof is propagated through the bent waveguide and is modulated depending upon the reverse bias applied across the electrodes 28 and 29 and hence the thickness of the depletion layer or waveguide due to the radiation loss. Thus the light output which has been modulated by the reverse bias voltage emerges out of the other end of the waveguide or n$^-$ type silicon layer 26.

Figure 4:
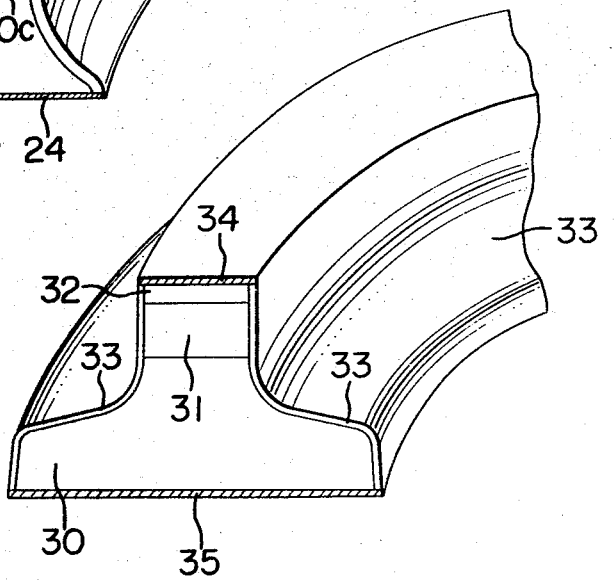

In FIG. 4 there is shown the third embodiment of the present invention comprising a p$^+$ type silicon substrate 30 and an i type silicon layer 31 formed over the substrate 30. Formed over the layer 31 is an n$^+$ type silicon layer 32 and ohmic contact electrodes 34 and 35 are joined to the top surface of the layer 32 and the bottom of the silicon substrate 30, respectively. Both the side faces of the layers 31 and 32 are etched so as to be curved or bent with a predetermined radius of curvature in the longitudinal direction, and the etched side surfaces are coated with an oxide film 33.

Next the mode of operation will be described. A forward bias is applied across the electrodes 34 and 35 to inject the carriers into the i type silicon layer 31 so that the dielectric constant of the layer 31 is varied and accordingly the radiation loss in the optical waveguide formed with the in i type silicon layer 31 is varied.

Instead of an i type silicon an n$^-$ type silicon may be used to form the layer 31. In this case, a reverse bias is applied across the electrodes 34 and 35. Then the depletion region is formed at the junction between the p$^+$ type silicon substrate 30 and the n$^-$ type layer 31 and the thickness of this depletion region varies depending upon the reverse bias voltage applied. Therefore the radiation loss of light energy propagated through this depletion region may be controlled accordingly.

In both cases, therefore, light which has in injected at one end face of the silicon layer 31 is modulated in response to a voltage applied across the electrodes 34 and 35, and the modulated light output emerges out of the other end face of the region 31.

What is claimed is:

1. A light modulator, comprising:
    a semiconductor substrate,
    a curved optical waveguide comprising an elongated arcuate semiconductor layer of substantially intrinsic material formed on said semiconductor substrate and curved with a predetermined radius of curvature, one end of said curved optical waveguide being an input end and the other end being an output end,
    first and second carrier density changing metallic electrodes disposed on said substrate and said elongated arcuate layer respectively, for changing the dielectric constant of said curved optical waveguide by injecting both electrons and holes into a region of said arcuate semiconductor layer, and
    a semiconductor electrode layer contiguous with at least one of said pair of metallic electrodes.
2. A light modulator as set forth in claim 1, wherein said semiconductor electrode layer is contiguous with said elongated arcuate semiconductor layer.
3. A light modulator as set forth in claim 1, wherein said semiconductor electrode layer is formed on a region contiguous with said optical waveguide.
4. A light modulator as set forth in claim 1, wherein said semiconductor substrate comprises a semiconductor material selected from the group consisting of silicon, germanium, gallium-arsenide and aluminum-gallium-arsenide.
5. A light modulator as set forth in claim 1 wherein said optical waveguide is formed of the same semiconductor as said substrate, and has a carrier density lower than that of said substrate,
    said semiconductor substrate being formed of a semiconductor material selected from the group consisting of silicon, germanium and gallium-arsenide.
6. A light modulator as set forth in claim 5, wherein said optical waveguide is formed of a semiconductor material selected from a group consisting of gallium-arsenide and alluminum-gallium-arsenide and has a carrier density lower than that of said semiconductor substrate,
    said semiconductor substrate being formed of an aluminum-gallium-arsenide semiconductor.
7. A light modulator, comprising:
    a p$^+$ type silicon substrate,
    an elongated arcuate p$^-$ type first silicon electrode layer formed on said silicon substrate and having a predetermined radius of curvature,
    an i type silicon layer formed on said silicon substrate and said first p$^-$ silicon electrode layer,
    a n$^+$ type second silicon electrode layer formed on said i type silicon layer opposite said first silicon electrode layer and having the same radius of curvature as that of said first silicon electrode layer, whereby said i type silicon layer is divided into an intermediate i type region sandwiched between said first and second silicon electrode layers into which region the current flow concentrates when a voltage is applied across said first and second silicon electrode layers, in inner i type silicon layer radially inwardly contiguous with said intermediate i type region, and an outer i type silicon layer radially outwardly contiguous with said intermediate i type regions, a silicon oxide insulating layer formed on the top surface of said inner i-type region and said outer i type region, a silicon oxide insulating layer formed on the inner side face of said inner i type region which is etched to have the same radius of curvature as that of said first and second silicon electrode layers and a predetermined width, a metallic electrode formed on said second silicon electrode layer and having the same radius of curvature as that of said second silicon electrode layer for changing the carrier density in said i type intermediate silicon region, when an electric potential is applied between metallic electrodes formed on said second semiconductor electrode layer, and a metallic electrode formed on the bottom of said $p^+$ type silicon substrate.

8. A light modulator, comprising:
a p type silicon substrate,
an elongated arcuate $n^-$ type first silicon layer formed on said silicon substrate and providing a P-N junction therewith, said first layer having a rectangular cross section and curved with a predetermined radius of curvature,
a n type second silicon layer formed on said silicon substrate on said first $n^-$ type silicon layer, and first and second metallic electrodes formed on the bottom of said silicon substrate and the top surface of said second silicon layer, respectively; and
means for reverse biasing said P-N junction whereby the carrier density in said second silicon layer is varied.

9. A light modulator, comprising:
a $p^+$ type silicon substrate,
an elongated arcuate i type first silicon layer formed on the top surface of said silicon substrate,
an elongated arcuate $n^+$ type second silicon layer formed on the top surface of said first silicon layer, the side faces of said first and second silicon layer being etched so as to be curved with a predetermined radius of curvature and a predetermined width in the longitudinal direction,
a silicon oxide layer formed on said side faces of said first and said second silicon layers, and
a curved metallic electrode formed on the top surface of said second silicon layer and a metallic electrode formed on the bottom of said silicon substrate whereby when a forward bias voltage is applied across said metallic electrodes, the carrier density in said i type first silicon layer is varied.

10. A light modulator, comprising:
a $p^+$ type silicon substrate,
an elongated arcuate $n^-$ type first silicon layer formed on the top surface of said silicon substrate and providing a P-N junction therewith,
an elongated arcuate $n^+$ type second silicon layer formed on the top surface of said silicon substrate, side faces of said first and second silicon layers being etched so as to be curved with a predetermined radius of curvature and a predetermined width in the longitudinal direction,
a silicon oxide layer formed on said side faces of first and second silicon layers,
a curved metallic electrode formed on the top surface of said second silicon layer and a metallic electrode formed on the bottom of said silicon substrate, and
means for applying a reverse bias voltage across said metallic electrodes to vary the carrier density in said $n^-$ type first silicon layer.

* * * * *

UNITED STATES PATENT OFFICE
CERTIFICATE OF CORRECTION

Patent No. 4,145,121              Dated March 20, 1979

Inventor(s)    Susumu Hata, et al.

It is certified that error appears in the above-identified patent and that said Letters Patent are hereby corrected as shown below:

Column 1, line 55:  change "ligh" to --light--.

Column 2, line 47:  "change "corelated" to --correlated--.

Column 6, line  3:  change "in" to --been--.

Signed and Sealed this

*Eighteenth* Day of *September 1979*

[SEAL]

*Attest:*

*Attesting Officer*        LUTRELLE F. PARKER
                *Acting Commissioner of Patents and Trademarks*